US010664704B2

(12) United States Patent
Jones et al.

(10) Patent No.: US 10,664,704 B2
(45) Date of Patent: May 26, 2020

(54) SYSTEMS, DEVICES, AND METHODS FOR MONITORING OBJECT LOCATIONS

(71) Applicant: Walmart Apollo, LLC, Bentonville, AR (US)

(72) Inventors: Nicholaus Adam Jones, Fayetteville, AR (US); Matthew Allen Jones, Bentonville, AR (US); Aaron Vasgaard, Fayetteville, AR (US)

(73) Assignee: Walmart Apollo, LLC, Bentonville, AR (US)

( * ) Notice: Subject to any disclaimer, the term of this patent is extended or adjusted under 35 U.S.C. 154(b) by 71 days.

(21) Appl. No.: 15/982,783

(22) Filed: May 17, 2018

(65) Prior Publication Data

US 2018/0336416 A1 Nov. 22, 2018

Related U.S. Application Data

(60) Provisional application No. 62/507,839, filed on May 18, 2017.

(51) Int. Cl.
*G06Q 10/08* (2012.01)
*G06K 9/00* (2006.01)
(Continued)

(52) U.S. Cl.
CPC ......... *G06K 9/00671* (2013.01); *B66D 3/22* (2013.01); *G06Q 10/087* (2013.01); *G06T 7/521* (2017.01); *G06K 2209/19* (2013.01)

(58) Field of Classification Search
None
See application file for complete search history.

(56) References Cited

U.S. PATENT DOCUMENTS 7,693,757 B2   4/2010   Zimmerman
8,429,004 B2   4/2013   Hamilton et al.
(Continued)

FOREIGN PATENT DOCUMENTS

KR   101349756 B1 * 1/2014

OTHER PUBLICATIONS

Schairer, Timo et al., Integrated Scenario for Machine-Aided Inventory Using Ambient Sensors, IAT: University of Stuttgart, Stuggart, Germany, 2008.
(Continued)

*Primary Examiner* — Christle I Marshall
(74) *Attorney, Agent, or Firm* — McCarter & English, LLP; David R. Burns

(57) ABSTRACT

Methodologies, systems, and computer-readable media are provided for monitoring object locations on a shelving fixture. An electronic detection device includes a first motor for winding and unwinding a first line and a second motor for winding and unwinding a second line. A controller can control the operation of the first and second motor and the electronic detection device is suspended from the first and second line behind a shelving fixture. When the first and second motor wind and unwind the first and second line, the electronic detection device moves to an expected location of an object on a shelving fixture. The electronic detection device also includes sensors that can determine an identity of the object and the quantity of the object on the shelving fixture.

20 Claims, 5 Drawing Sheets

(51) Int. Cl.
*B66D 3/22* (2006.01)
*G06T 7/521* (2017.01)

(56) References Cited

U.S. PATENT DOCUMENTS

| | | |
|---|---|---|
| 9,120,622 B1 | 9/2015 | Elazary et al. |
| 9,129,251 B2 | 9/2015 | Davidson |
| 9,129,277 B2 | 9/2015 | MacIntosh |
| 9,309,050 B2 | 4/2016 | Toebes et al. |
| 10,262,172 B1 * | 4/2019 | Niranjayan ........ G06K 7/10425 |
| 2006/0102718 A1 * | 5/2006 | Kajino ................ G06Q 10/087 |
| | | 235/385 |
| 2017/0249587 A1 * | 8/2017 | Jones .................... G08B 21/24 |
| 2018/0082245 A1 * | 3/2018 | Jones ................... G06Q 10/087 |
| 2018/0213160 A1 * | 7/2018 | Tomiyama ........... G05B 19/402 |
| 2018/0225625 A1 * | 8/2018 | DiFatta ............... G06Q 10/087 |

OTHER PUBLICATIONS

Stuart, Sophia, Meet Tally, the Robot that Knows What's on Store Shelve, PCMag India, Jan. 27, 2106.

\* cited by examiner

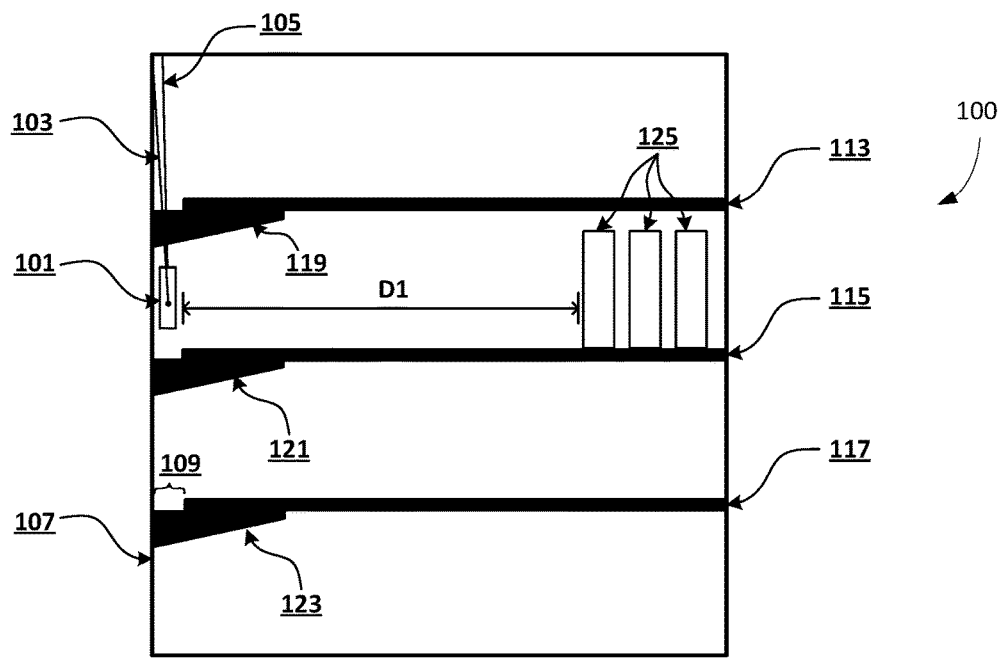
FIG. 1
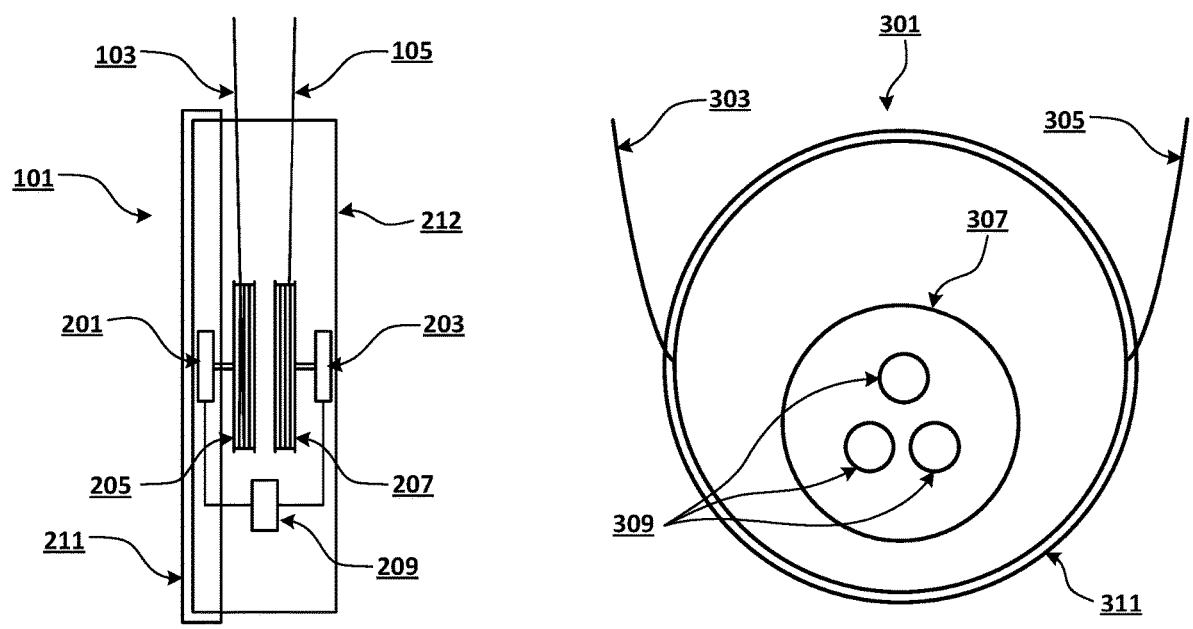
FIG. 2
FIG. 3

SYSTEMS, DEVICES, AND METHODS FOR MONITORING OBJECT LOCATIONS

RELATED APPLICATIONS

This application claims priority to U.S. Provisional Patent Application No. 62/507,839 entitled "SYSTEMS, DEVICES, AND METHODS FOR MONITORING OBJECT LOCATIONS," filed on May 18, 2017, the content of which is hereby incorporated by reference in its entirety.

BACKGROUND

Objects in a facility must be inventoried to determine their presence. Further, continued monitoring of an object may be necessary to determine an object's continued presence at an assigned location.

SUMMARY

Embodiments of the present invention utilize an electronic detection device that can travel behind a shelving unit and collect data relating to the identity and amount of objects within the shelving unit. For example, the electronic detection device can be suspended in a gap behind a shelving unit from two lines or tethers, and each line can be wound about a separate spool within the electronic detection device. Each spool can be connected to a separate motor so that the motors can wind and unwind each line independently, allowing the electronic detection device to move within the gap behind the shelving unit both horizontally and vertically based on the operation of the motors. The electronic detection device can include sensors to scan objects on the shelving unit and determine an identity and/or quantity of the objects.

In one embodiment, a system for monitoring object locations on a shelving fixture includes a first motor disposed within an electronic detection device and configured to control a winding operation and an unwinding operation of a first line. The system also includes a second motor disposed within the electronic detection device and configured to control a winding operation and an unwinding operation of a second line. The system also includes a controller in communication with the first and second motors disposed within the electronic detection device. The electronic detection device is suspended from the first line and the second line, and the controller is configured to control an operation of the first motor and the second motor to move and position the electronic detection device proximal to an expected location of an object on the shelving fixture. The system also includes one or more sensors associated with the electronic detection device and configured to determine an identity of the object and a quantity of the object at the expected location.

In another embodiment, a method for monitoring object locations on shelving fixtures includes suspending an electronic detection device from a first line and a second line and disposing the electronic detection device along a back wall of a shelving fixture. The method also includes controlling a first motor of the electronic detection device, via a controller, to wind the first line around a first spool of the electronic detection device; and controlling a second motor of the electronic detection device, via the controller, to unwind the second line from a second spool of the electronic detection device. The method also includes moving the electronic detection device along the back wall of the shelving fixture near to an expected location of an object disposed on the shelving fixture in response to controlling the first and second motors. The method also includes determining an identity of the object and a quantity of the object at the expected location using one or more sensors associated with the electronic detection device.

In another embodiment, an object monitoring device includes a housing having a first opening and a second opening, a first spool, and a second spool. The device also includes a first line having a first terminal end coupled to the first spool and a second terminal end extending through the first opening in the housing. The second terminal end of the first line is configured to be anchored to a shelving fixture. The device also includes a second line having a first terminal end operatively coupled to the second spool and a second terminal end extending through the second opening in the housing. The second terminal end of the second line is configured to be anchored to a shelving fixture, and the electronic detection device is configured to be suspended from the first line and the second line. The device also includes a first motor within a housing and coupled to the first spool and configured to rotate the first spool to wind the first line on the first spool or to unwind the first line from the first spool. The device also includes a second motor within the housing and coupled to the second spool and configured to rotate the second spool to wind the second line on the second spool or to unwind the second line from the spool. The device also includes a controller in communication with the first and second motor disposed within the housing, the controller being configured to control the winding of the first and second lines with the first motor and the second motor to move and position the electronic detection device near to an expected location of an object on the shelving fixture. The device also includes one or more sensors associated with the electronic detection device and configured to determine an identity of the object and a quantity of the object at the expected location.

Additional combinations and/or permutations of the above examples are envisioned as being within the scope of the present disclosure. It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein.

BRIEF DESCRIPTION OF THE DRAWINGS

The skilled artisan will understand that the drawings are primarily for illustrative purposes and are not intended to limit the scope of the inventive subject matter described herein. The drawings are not necessarily to scale; in some instances, various aspects of the inventive subject matter disclosed herein may be shown exaggerated or enlarged in the drawings to facilitate an understanding of different features. In the drawings, like reference characters generally refer to like features (e.g., functionally similar and/or structurally similar elements).

The foregoing and other features and advantages provided by the present invention will be more fully understood from the following description of exemplary embodiments when read together with the accompanying drawings, in which:

FIG. 1 depicts a shelving fixture with an electronic detection device suspended near a back wall, in accordance with embodiments of the present disclosure.

FIG. 2 is a cross-sectional view of an electronic detection device for monitoring object locations, in accordance with embodiments of the present disclosure.

FIG. 3 depicts an example electronic detection device for monitoring object locations, in accordance with embodiments of the present disclosure.

DETAILED DESCRIPTION

Figure 4:
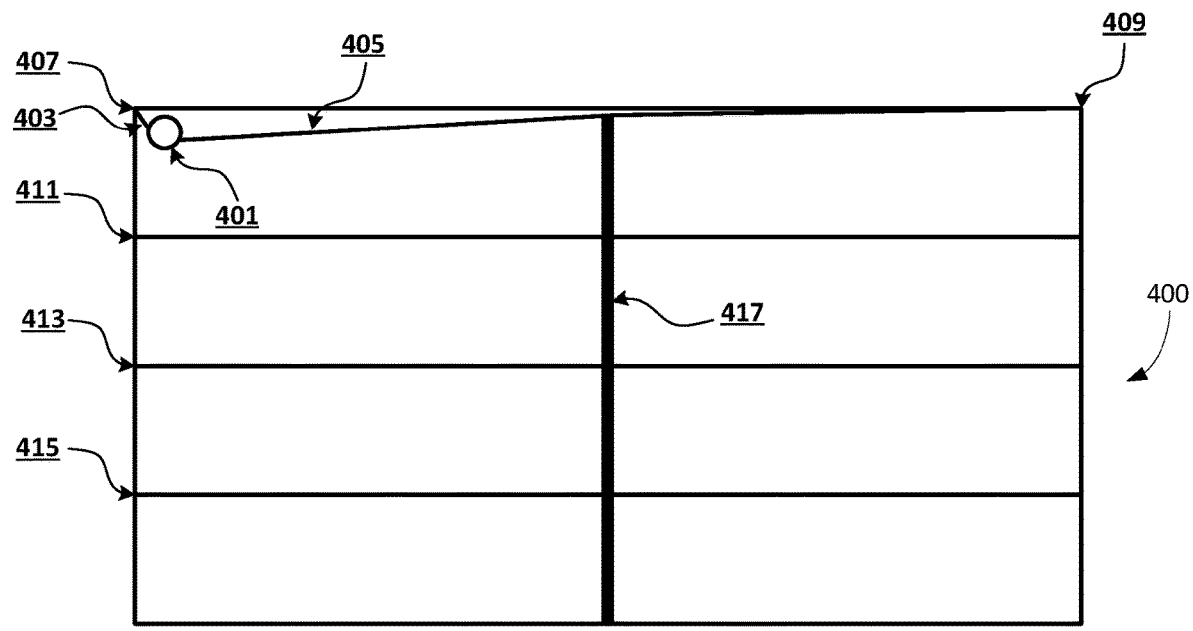
FIG. 4 depicts a shelving fixture with an electronic detection device for monitoring object locations, in accordance with embodiments of the present disclosure.

Following below are more detailed descriptions of various concepts related to, and embodiments of, inventive methods, apparatus, and systems for associating delivery information with a remotely located package. It should be appreciated that various concepts introduced above and discussed in greater detail below may be implemented in any of numerous ways, as the disclosed concepts are not limited to any particular manner of implementation. Examples of specific implementations and applications are provided primarily for illustrative purposes.

As used herein, the term "includes" means "includes but is not limited to", the term "including" means "including but not limited to". The term "based on" means "based at least in part on".

Objects disposed on shelving fixtures typically include a machine-readable code, such as a barcode, on the back side of their packaging that can be used to help identify the object. Additionally, in order to determine the quantity of the object on a particular shelf, it may be necessary to see how much space is present between the rear-most object on the shelf and the back of the shelf since objects are typically placed as far to the front of the shelf as possible, in order to make it easier for individuals to retrieve objects from the front of the shelf. Thus, it may be difficult to quickly determine the identity of an object or the amount of an object at a particular shelf location, unless the objects are enabled with RFID chips.

Methodologies, systems, apparatus, and non-transitory computer-readable media are described herein to facilitate determining the identity of objects and the amount of objects at a particular location without the use of RFID chips. In exemplary embodiments, an electronic detection device can be suspended from two lines in a gap between a shelving unit and a back wall behind the shelving unit. By accessing the back of the shelving unit, sensors on the electronic detection device can scan the back of the objects on the shelving unit and collect data relating to the identity of objects and the amount of objects. In exemplary embodiments, the two lines from which the electronic detection device is suspended can be anchored to the upper corners of the shelving fixture and can be wound around separate spools within the electronic detection device. Each spool can be controlled by a separate motor to wind and unwind the lines independently, thus allowing the electronic detection device to move around the back of the shelving unit in both horizontal and vertical directions and scan objects on the shelves. In an exemplary embodiment, an electronic detection device, traverses the back of shelving fixture with a first motor and second motor configured to provide movement of the electronic detection device. The electronic detection device can include one or more sensors configured to measure a distance between the electronic detection device and an object on the shelving fixture.

In exemplary embodiments, the sensors can include a camera, a barcode reader, or an infrared sensor that can scan objects on the shelving unit and determine an identity or quantity of the objects. The sensors can read a barcode or other machine-readable code located on the rear of an object using a camera or barcode reader, and can determine the number of products on the shelf based on identifying the distance from the last object to the rear edge of the shelf. For example, if there is a seven inch distance between the last object on a shelf and the rear of the shelf as determined by the electronic detection device, and the object that is supposed to be in that location is a container of cereal that is two inches wide, then the shelf has space for three more of those containers of cereal. Likewise, if the overall distance from the back of the shelf to the front of the shelf is fifteen inches and there are seven inches of empty space at the back of the shelf, the electronic detection device can determine that four boxes of cereal are currently located at that location on the shelf.

Exemplary embodiments are described below with reference to the drawings. One of ordinary skill in the art will recognize that exemplary embodiments are not limited to the illustrative embodiments, and that components of exemplary systems, devices and methods are not limited to the illustrative embodiments described below.

FIG. 1 depicts a side view of a shelving fixture 100 with an electronic detection device 101 suspended near a back wall 107, in accordance with embodiments of the present disclosure. In exemplary embodiments, the shelving fixture 100 includes a number of shelves 113, 115, 117 which connect to the back wall 107 using supports 119, 121, 123. Between each of the shelves 113, 115, 117 and the back wall 107, there is a gap 109 within which the electronic detection device 101 can be suspended. In exemplary embodiments, the gap 109 is between about one or two inches, and therefore the width of the electronic detection device 101 must be less than about one or two inches in order to fit within the gap 109. As can be seen in this embodiment, the first line 103 and the second line 105 can be fastened or anchored to the top corners of the shelving fixture 100, and the electronic detection device 101 is suspended from a first line 103 and a second line 105. In exemplary embodiments, the first line and the second line can pass through holes in the housing of the electronic detection device 101 and can be wound or unwound around spools within the electronic detection device 101 in order to raise, lower, or otherwise relocate the electronic detection device 101 within the gap 109 between the shelves 113, 115, 117 and the back wall 107. In exemplary embodiments, the shelves 113, 115, 117 can be configured to hold one or more objects 125, which are typically located near the front of the shelves 113, 115, 117. The electronic detection device 101 can include one or more sensors, described in more detail with reference to FIG. 3, which can detect a distance D1 between the back of the shelf 115 and a rear-most product 125 on the shelf 115. In some embodiments, the sensors can also scan and read a machine-readable code located on one of the products 125. By measuring the distance D1, a computing system in communication with the electronic detection device 101 can determine how many products 125 remain on the shelf 115, and thereby know whether the shelf 115 needs to be restocked. The computing system can also determine whether the products 125 are in their proper location within the shelving fixture 100. In exemplary embodiments, the computing system can access a planogram or object layout plan in order to determine which objects are intended to be in which locations.

FIG. 2 is a cross-sectional view of an electronic detection device 101 for monitoring object locations, in accordance with embodiments of the present disclosure. As described above, the electronic detection device 101 can be suspended from a first line 103 and a second line 105, which can be wound around a first spool 205 and a second spool 207, respectively. The first spool 205 can be controlled independently using a first motor 201, and the second spool can be controlled independently using a second motor 203. In exemplary embodiments, one end of the first line 103 is anchored to a portion of the shelving fixture, as described above, while a second end of the first line 103 is coupled to the first spool 205. One end of the second line 105 can also be anchored to a portion of the shelving fixture, in some embodiments, while a second end of the second line 105 is coupled to the second spool 207. For example, in one embodiment the first and second lines may be anchored to the opposing top corners or the shelving fixture. The first motor 201 can rotate the first spool 205 to wind the first line 103 around the first spool 205 or to unwind the first line 103 from the first spool 205. Similarly, the second motor 203 can rotate the second spool 207 to wind the second line 105 around the second spool 207 or to unwind the second line 105 from the second spool 207. In one embodiment, the combined length of the first line 103 and second line 105 is sufficient to allow the electronic detection device to change its vertical and horizontal positions so as to enable the electronic detection device to traverse any of the shelves of the shelving unit. In some embodiments, the electronic detection device can also include a controller 209 that can control the operation of the first motor 201 and the second motor 203. In exemplary embodiments, the electronic detection device 101 can include a bearing 211 on an external portion of a housing 212 of the electronic detection device 101 that can allow a portion of the electronic detection device 101 to rotate. This bearing 211 can help the electronic detection device 101 roll over certain barriers or obstacles in a shelving fixture, in some embodiments.

FIG. 3 depicts an example electronic detection device 301 for monitoring object locations, in accordance with embodiments of the present disclosure. In exemplary embodiments, the electronic detection device 301 can be suspended from a first line 303 and a second line 305 in a gap between the back of a number of shelves and a back wall, as discussed above in reference to FIG. 1. The first line 303 and the second line 305 can be coupled to the electronic detection device 301 such that a sensor array 307 including multiple sensors 309 is pointing in a desired direction. These sensors 309 within the sensor array 307 can be used, for example, to determine a distance between the back of the shelves and objects on the shelves or to scan machine-readable codes on the back of the objects. In exemplary embodiments, the sensors 309 can include infrared sensors, barcode scanners, or cameras configured to capture images or video of the objects on the shelves. Additionally, the sensors 309 can include laser range finder to identify the distance D1. Based on the distance D1 to the back of the rear-most product 125 on the shelf 115, an amount of missing stock can be determined. The rear-most product 125 can be identified by the sensors, a volumetric dimension of the rear-most product can be retrieved, and based on the distance D1 and the volumetric dimension, an estimate of a number of the rear-most product 125 for filling the distance D1 can be calculated. In exemplary embodiments, the D1 can be inclusive to a spring loaded follower used to advance the rear-most product 125 to the front of the shelf 115. In exemplary embodiments, the electronic detection device 301 can include a bearing 311 on an external portion of the device 301. In some embodiments, the bearing 311 can allow a portion of the electronic detection device 301 to rotate and roll over barriers or obstacles within a shelving fixture, as described above in reference to FIG. 2.

FIG. 4 depicts an exemplary shelving fixture 400 with an electronic detection device 401 for monitoring object locations, in accordance with embodiments of the present disclosure. In this example embodiment, the shelving fixture 400 includes a three shelves 411, 413, 415 and a middle dividing portion 417. The electronic detection device 401 is suspended from a first line 403 and a second line 405, which are anchored at the upper corners 407 and 409 of the shelving fixture, respectively. As discussed above, the electronic detection device 401 can include distinct motors within its housing to wind and unwind the first line 403 and the second line 405. In exemplary embodiments, power can be provided to the electronic detection device 401 through one of the lines 403, 405. For example, the first line 403 can be positive and the second line 405 can be negative, or vice versa. The motors within the electronic detection device 401 can also be controlled with signals via the first line 403 or the second line 405, which can be connected to a network or computing system, in some embodiments. The first line 403 or the second line 405 can also be used to transmit data captured from the sensors of the electronic detection device 401 to a computing system.

Figure 5:
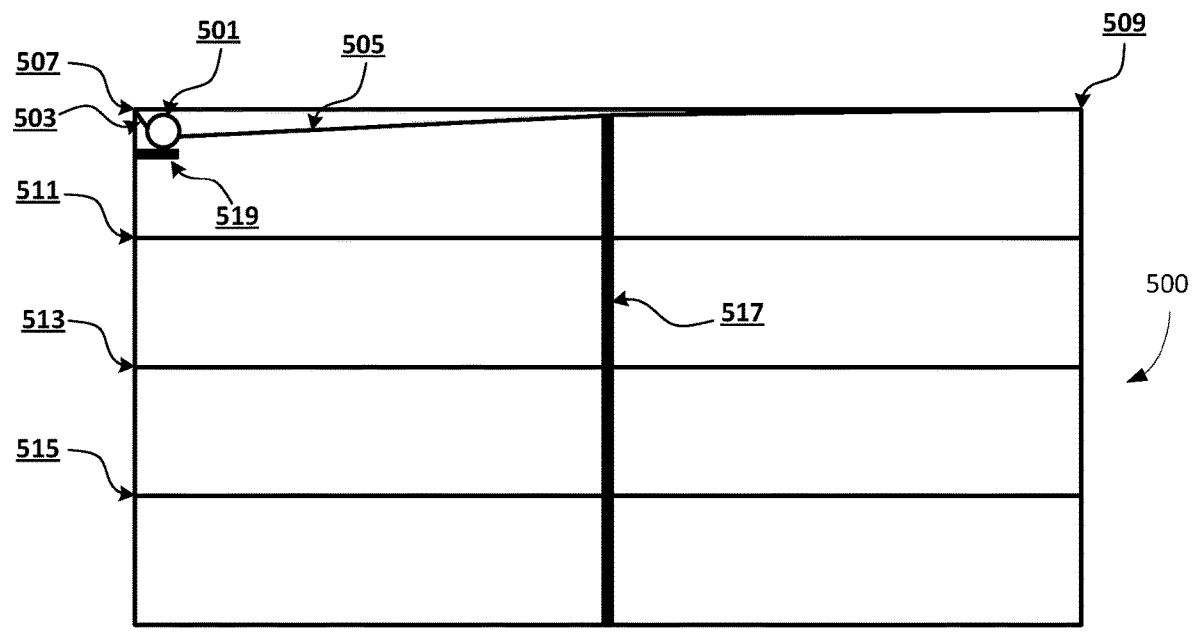
FIG. 5 depicts a shelving fixture with an electronic detection device for monitoring object locations at a docking station, in accordance with embodiments of the present disclosure.

FIG. 5 depicts another example shelving fixture 500 with an electronic detection device 501 for monitoring object locations at a docking station 519, in accordance with embodiments of the present disclosure. In this example embodiment, the shelving fixture 500 includes three shelves 511, 513, 515 and a middle dividing portion 517. The electronic detection device 501 is suspended from a first line 503 and a second line 505, which are anchored at the upper corners 507 and 509 of the shelving fixture, respectively. As discussed above, the electronic detection device 501 can include distinct motors within its housing to wind and unwind the first line 503 and the second line 505. In exemplary embodiments, the electronic detection device 501 can include a battery that can be charged via a docking station 519. In some embodiments, the docking station 519 can also be used to transmit instructions for the motors within the electronic detection device 501 and to receive data captured by the sensors of the electronic detection device 501. The docking station can be used to transmit data or information between the electronic detection device 501 and a computing system, such as data collected from the sensors of the electronic detection device 501 or data relating to a virtual planogram of the shelving fixture 500. In exemplary embodiments, once the electronic detection device 501 receives instructions and is sufficiently charged via the docking station 519, the motors within the electronic detection device 501 can wind and unwind the lines 503 and 505 to cause the electronic detection device 501 to travel through the gap between the shelves 511, 513, 515 and the back wall. After the electronic detection device 501 has scanned each of the shelves 511, 513, 515, the motors can wind the first line 503 and unwind the second line 505 to return the electronic detection device 501 to the docking station 519 and transmit any data collected by the sensors of the electronic detection device.

Figure 6:
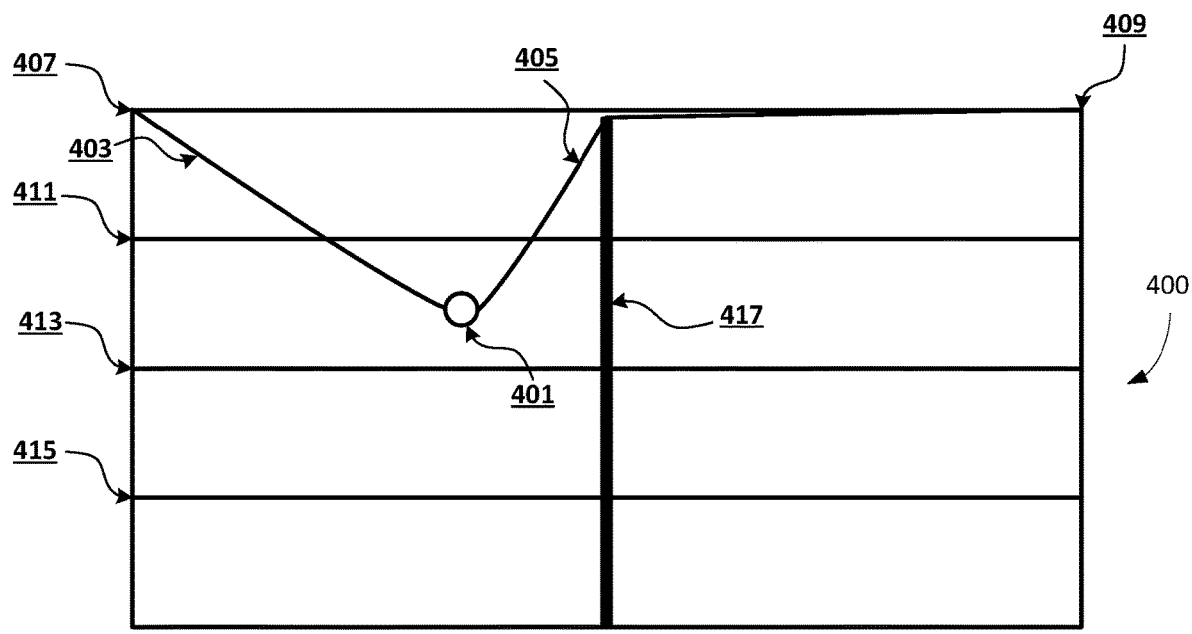
FIG. 6 depicts another view of the shelving fixture of FIG. 4, in accordance with embodiments of the present disclosure.

FIG. 6 depicts another view of the shelving fixture 400 of FIG. 4, in accordance with embodiments of the present disclosure. In this example embodiment, the shelving fixture 400 includes three shelves 411, 413, 415 and a middle dividing portion 417. The electronic detection device 401 is suspended from a first line 403 and a second line 405, which are anchored at the upper corners 407 and 409 of the shelving fixture, respectively. As discussed above, the electronic detection device 401 can include distinct motors within its housing to wind and unwind the first line 403 and the second line 405. As can be seen in this example embodiment, the first line 403 has unwound and the second line 405 has wound to allow the electronic detection device 401 to be suspended between the top shelf 411 and the middle shelf 413, and slightly offset toward the middle dividing portion 417. The first line 403 or the second line 405 can also be used to transmit data or information between the electronic detection device 401 and a computing system, such as data collected from the sensors of the electronic detection device 401 or data relating to a virtual planogram of the shelving fixture 400. By referencing a virtual planogram of the shelving fixture 400 and also knowing how much of the first line 403 and the second line 405 are wound or unwound from the electronic detection device 401, a computing system can determine the location of the electronic detection device 401 within the gap behind the shelves 411, 413, 415. As can be seen in this example embodiment, the electronic detection device 401 can be lowered from the upper left corner 407 to any location to the left of the middle dividing portion 417. In order to be positioned to the right of the middle dividing portion 417, the second line 405 should be wound around a spool within the electronic detection device 401 and the first line 403 should be held tight to maintain the electronic detection device 401 near the top of the shelving fixture 400. As the second line 405 is wound within the electronic detection device 401, the electronic detection device 401 can pass over the top of the middle dividing portion 417 and will then be allowed to drop within the gap behind the shelves 411, 413, 415 to the right of the middle dividing portion 417.

In exemplary embodiments, the electronic detection device 401 can move from a section of the shelving fixture 400 to the left of the middle dividing portion 417 to a section of the shelving fixture 400 to the right of the middle dividing portion 417. For example, the first line 403 can be extended and the second line 405 can be retracted in order to pull the electronic detection device 401 into a section of the shelving fixture 400 to the right of the middle dividing portion 417. In exemplary embodiments, the electronic detection device 401 can include an external bearing on a portion of its housing, as described above in reference to FIGS. 2-3, that would allow a small portion of the housing to rotate so that the electronic detection device can more easily roll over the middle dividing portion 417.

Figure 7:
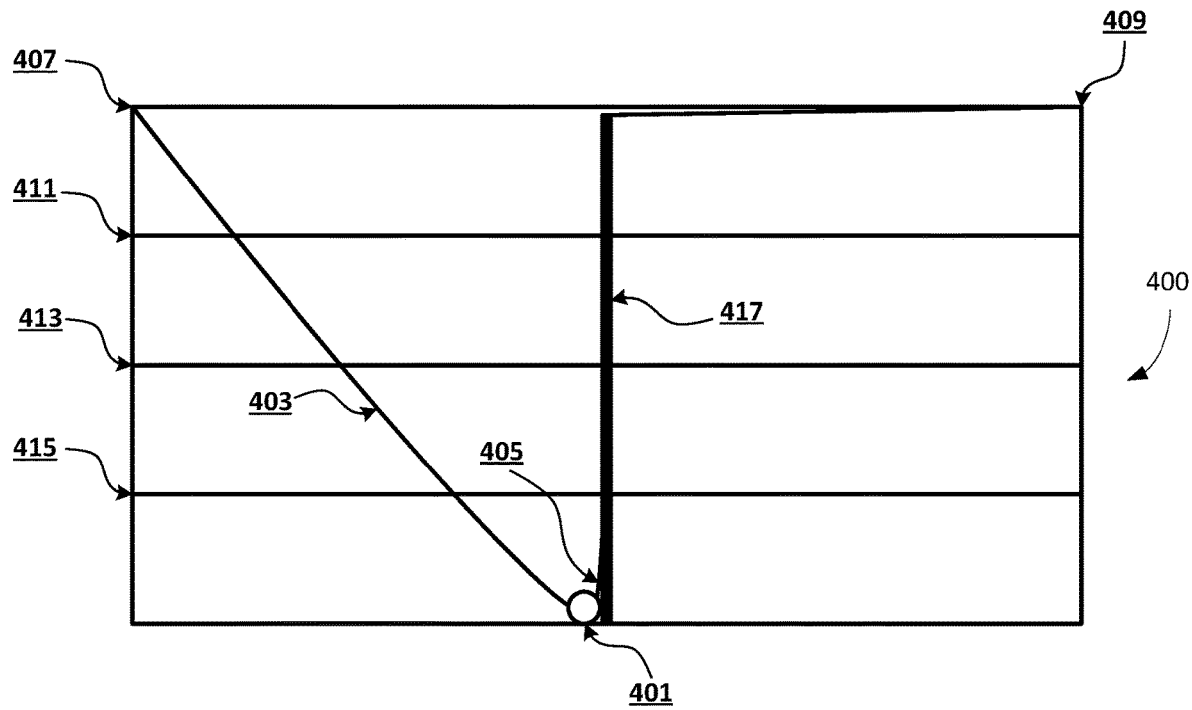
FIG. 7 depicts another view of the shelving fixture of FIG. 4, in accordance with embodiments of the present disclosure.

FIG. 7 depicts another view of the shelving fixture 400 of FIG. 4, in accordance with embodiments of the present disclosure. As discussed above, the shelving fixture 400 includes three shelves 411, 413, 415 and a middle dividing portion 417. The electronic detection device 401 is suspended from a first line 403 and a second line 405, which are anchored at the upper corners 407 and 409 of the shelving fixture, respectively. As discussed above, the electronic detection device 401 can include distinct motors within its housing to wind and unwind the first line 403 and the second line 405. As can be seen in this example embodiment, the first line 403 and the second line 405 have unwound to allow the electronic detection device 401 to be suspended near the floor and the middle dividing portion 417. The first line 403 or the second line 405 can also be used to transmit data or information between the electronic detection device 401 and a computing system, such as data collected from the sensors of the electronic detection device 401 or data relating to a virtual planogram of the shelving fixture 400. By referencing a virtual planogram of the shelving fixture 400 and also knowing how much of the first line 403 and the second line 405 are wound or unwound from the electronic detection device 401, a computing system can determine the location of the electronic detection device 401 within the gap behind the shelves 411, 413, 415. In exemplary embodiments, the electronic detection device 401 can be used to determine the dimensions of the shelving fixture 400. For example, when the electronic detection device 401 is lowered to the location shown in FIG. 7, where it is contacting the floor and the middle dividing portion 417, a computing system can measure how much of the first line 403 and the second line 405 are wound or unwound from the electronic detection device 401 and calculate the dimensions of the shelving fixture 400. In alternative embodiments, the electronic detection device 401 can be pre-programmed with the dimensions of the shelving fixture 400.

Although description contained herein has focused on an electronic detection device suspended from lines, it should be appreciated that other types of robotic devices not relying on lines are also within the scope of the present invention. For example, a robotic device, such as but not limited to, a small aerial, ground or crawling drone equipped with a laser range finder and operating independently from lines may operate behind or in front of a shelving unit to determine missing items from the shelving fixture and relay the information to a replenishment system.

Figure 8:
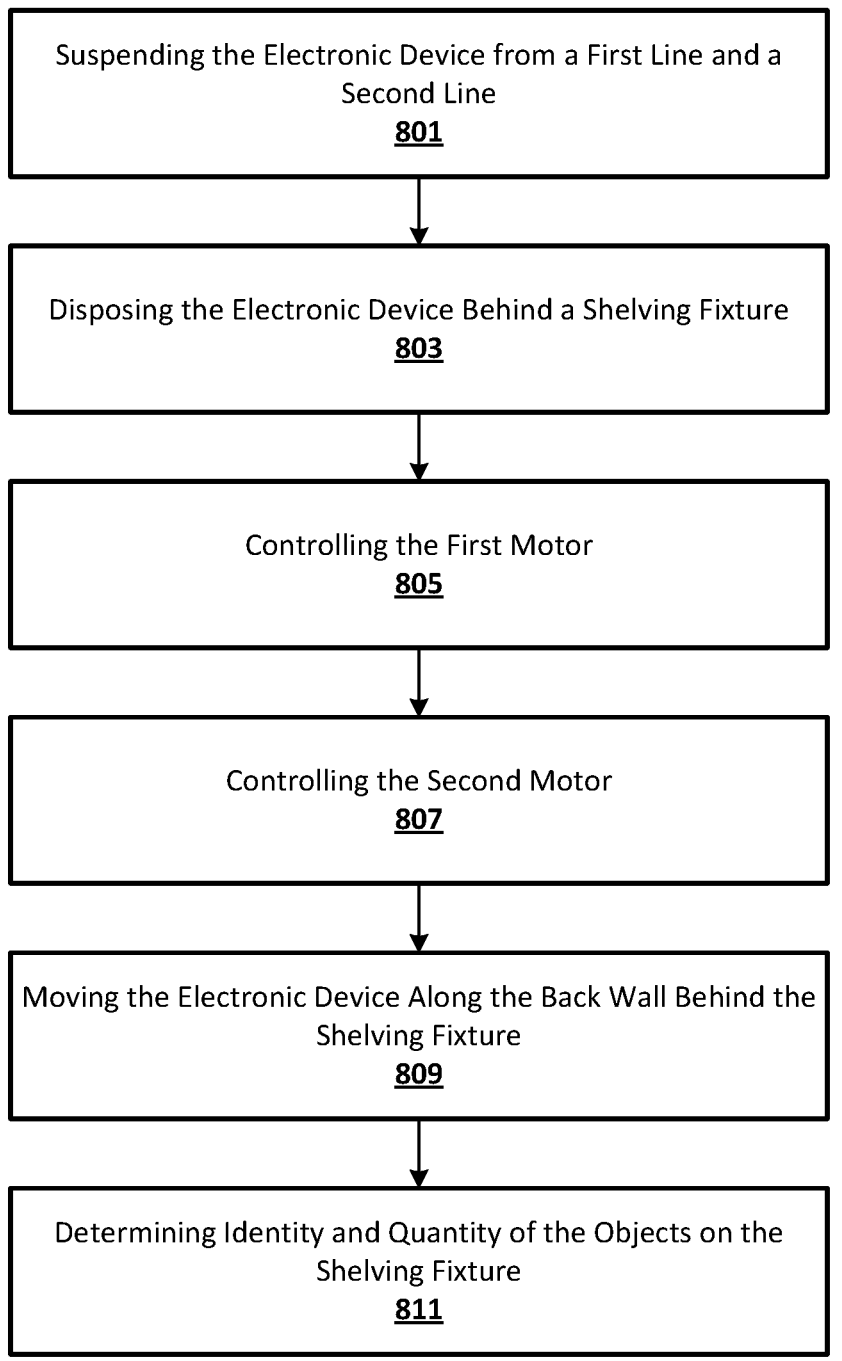
FIG. 8 is a flowchart illustrating a method for monitoring object locations, in accordance with embodiments of the present disclosure.

FIG. 8 is a flowchart illustrating a method for monitoring object locations, in accordance with embodiments of the present disclosure. In step 801, an electronic detection device is suspended from a first line and a second line. In exemplary embodiments, the electronic detection device can be received at a docking station, and the docking station can provide power to the electronic detection device or charge a battery associated with the electronic detection device. The docking station can also allow for communication between the electronic detection device and a computing system when the electronic detection device is operatively coupled to the docking station. In some embodiments, the docking station provides an electrical connection to transfer information between the electronic detection device and one or more remote servers.

In step 803, the electronic detection device is disposed along a back wall of a shelving fixture. As discussed above, there is a gap between the back wall and the shelves of a shelving fixture, and the electronic detection device can be suspended from the first line and the second line within this gap. In exemplary embodiments, the first line or the second line can provide power to the electronic detection device and can also transmit information between the electronic detection device and a computing system or one or more remote servers. The electronic detection device can include one or more sensors for detecting distances and capturing images of objects on the shelves of the shelving fixture, and the electronic detection device can be oriented in the gap behind the shelves such that the sensors are pointing toward the objects on the shelves.

In step 805, a first motor within the electronic detection device is controlled, via a controller, in order to wind the first line around the first spool of the electronic detection device. In exemplary embodiments, the first motor and the first spool are disposed within a housing of the electronic detection device. The controller can be disposed within the housing of the electronic detection device also, or remotely located from the electronic detection device.

In step 807, a second motor of the electronic detection device is controlled, via a controller, in order to unwind the second line from a second spool of the electronic detection device. In exemplary embodiments, the second motor and the second spool are disposed within a housing of the electronic detection device. As discussed above, the controller can be disposed within the housing of the electronic detection device or remotely located from the electronic detection device.

In step 809, the electronic detection device moves along the back wall of the shelving fixture in the gap between the back wall and the shelves. The electronic detection device moves through the gap between the back wall and the shelves to an expected location of an object on one of the shelves of the shelving fixture in response to controlling the first and second motors using the controller. In exemplary embodiments, the controller can reference a planogram or virtual chart of the shelving fixture in order to determine the expected location of the object and direct the electronic detection device to that location. Alternatively, the electronic detection device can be programmed to move along a predetermined path. For example, at various intervals, the electronic detection device can travel along a predetermined path to scan each shelf of the shelving fixture in a particular order. As discussed above, the electronic detection device can include one or more sensors for scanning objects on the shelves of the shelving fixture in order to determine the identity of the objects, the distance between the objects and the back of the shelving fixture, etc.

In step 811, an identity of the object and a quantity of the object at the expected location is determined using the one or more sensors associated with the electronic detection device. In exemplary embodiments, the sensors include a sensor configured to measure the distance between the rear edge of a shelf and the object, a camera configured to capture images or video of the object, or a sensor configured to read a machine-readable code associated with the object. In some embodiments, the dimensions of each shelf are known and can be compared against the distance between the electronic detection device and the object to determine the amount of empty space on the shelf behind the object. If the dimensions of the object are also known, a computing system or one or more remote servers in communication with the electronic detection device can determine the amount of objects on the shelf and whether the shelf needs to be re-stocked.

Figure 9:
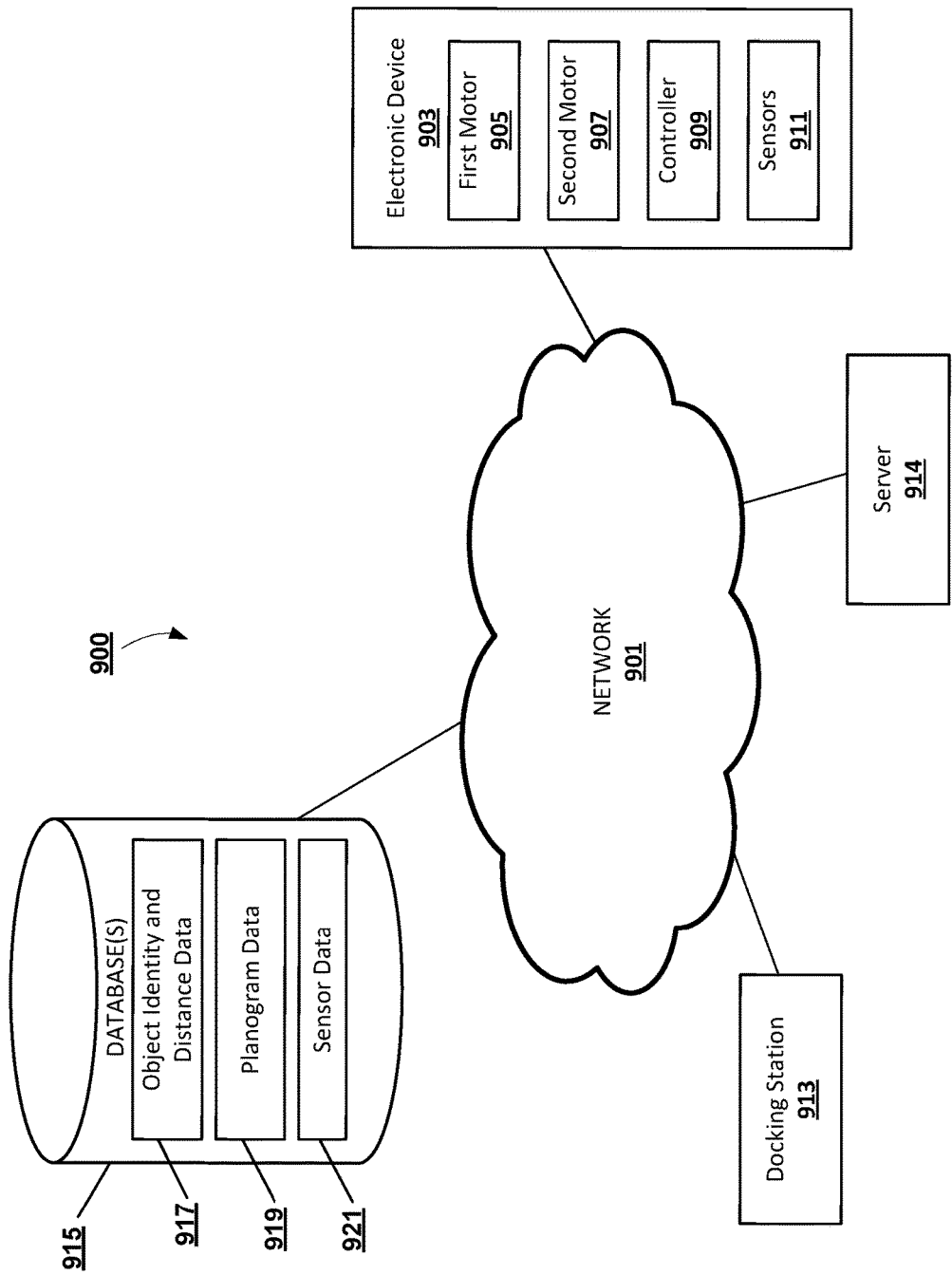
FIG. 9 is a diagram of an exemplary network environment suitable for a distributed implementation of an exemplary embodiment.

FIG. 9 illustrates a network diagram depicting a system 900 suitable for a distributed implementation of an exemplary embodiment. The system 900 can include a network 901, an electronic detection device 903 including a first motor 905, a second motor 907, a controller 909, sensors 911, a computing system or server 914, a docking station 913 and a database 915. As will be appreciated, various distributed or centralized configurations may be implemented without departing from the scope of the present invention. For example, in various embodiments the controller 909 can be located within the electronic detection device 903 or at the server 914 (from where it would communicate with the electronic detection device to control the operation of the motors). The database 915 can store the object identity and distance data 917, the planogram data 919, the sensor data 921 collected from the sensors 911, etc.

In exemplary embodiments, the electronic detection device 903, server 914, docking station 913, and the database 915 may connect to the network 901 via a wired or wireless connection. In some embodiments, the electronic detection device 903, server 914, docking station 913, and the database 915 may be in communication with each other via the communication network 901. The communication network 901 may include, but is not limited to, the Internet, an intranet, a LAN (Local Area Network), a WAN (Wide Area Network), a MAN (Metropolitan Area Network), a wireless network, an optical network, and the like. In one embodiment, the electronic detection device 903, server 914, docking station 913, and the database 915 can transmit instructions to each other over the communication network 901. In exemplary embodiments, the object identity and distance data 917, planogram data 919, and sensor data 921 can be stored at the database 915 and received at the server 914 or the controller 909 in response to a service performed by a database retrieval application. In exemplary embodiments, the controller 909 can execute instructions to control the first motor 905 and the second motor 907 to move the electronic detection device 903 along a particular path behind the shelves of a shelving fixture. The controller 909 can also control the sensors 911 to scan objects within the shelving fixture, as described above.

In describing example embodiments, specific terminology is used for the sake of clarity. For purposes of description, each specific term is intended to at least include all technical and functional equivalents that operate in a similar manner to accomplish a similar purpose. Additionally, in some instances where a particular example embodiment includes system elements, device components or method steps, those elements, components or steps can be replaced with a single element, component or step. Likewise, a single element, component or step can be replaced with a plurality of elements, components or steps that serve the same purpose. Moreover, while example embodiments have been shown and described with references to particular embodiments thereof, those of ordinary skill in the art will understand that various substitutions and alterations in form and detail can be made therein without departing from the scope of the disclosure. Further still, other aspects, functions and advantages are also within the scope of the disclosure.

Example flowcharts are provided herein for illustrative purposes and are non-limiting examples of methods. One of ordinary skill in the art will recognize that example methods can include more or fewer steps than those illustrated in the example flowcharts, and that the steps in the example flowcharts can be performed in a different order than the order shown in the illustrative flowcharts.

What is claimed is:

1. A system for monitoring object locations on a shelving fixture, the system comprising:
   an electronic detection device comprising:
      a first motor configured to create a first movement of the electronic detection device by retracting a first line operatively coupled to the first motor into the electronic detection device or extending the first line further out of the electronic device;

a second motor configured to control a second movement of the electronic detection device by retracting a second line operatively coupled to the second motor into the electronic detection device or extending the second line further out of the electronic device;

a controller in communication with the first and second motors disposed within the electronic detection device, and the controller being configured to control an operation of the first motor and the second motor to move and position the electronic detection device proximal to an expected location of an object on the shelving fixture; and one or more sensors configured to determine an identity of the object, the one or more sensors including a sensor configured to measure a distance between the electronic detection device and the object; and one or more remote servers communicably coupled to the electronic detection device wherein the one or more servers receive the distance and the identity and determine a quantity of the object to be added to the expected location.

2. The system of claim 1 wherein the electronic detection device is configured to be suspended from a shelving fixture, the first movement is created by the first motor controlling a winding operation and unwinding operation of the first line and the second movement is created by the second motor controlling a winding operation and unwinding operation of the second line, the first and second line coupled to the shelving fixture.

3. The system of claim 1, further comprising a docking station configured to receive the electronic detection device and provide an electrical charge to the electronic detection device.

4. The system of claim 3, further comprising a docking station configured to receive the electronic detection device and provide an electrical connection to transfer information between the electronic detection device and the one or more remote servers.

5. The system of claim 1, wherein the controller is configured to control an operation of the first motor and the second motor to move the electronic detection device along a predetermined path.

6. The system of claim 1, wherein the controller is disposed within the electronic detection device.

7. The system of claim 1, wherein the sensor configured to measure a distance between the electronic detection device and the object comprises a laser range finder.

8. The system of claim 1, wherein the one or more sensors include a camera configured to capture images or video of the object, or a sensor configured to read a machine-readable code associated with the object.

9. A method for monitoring object locations on shelving fixtures, the method comprising:

controlling a first motor of an electronic detection device, via a controller, to create a first movement of the electronic detection device by retracting a first line operatively coupled to the first motor into the electronic detection device;

controlling a second motor of the electronic detection device, via the controller, to control a second movement of the electronic detection device by retracting a second line operatively coupled to the second motor into the electronic detection device;

moving the electronic detection device along the back wall of the shelving fixture proximal to an expected location of an object disposed on the shelving fixture in response to controlling the first and second motors via the controller;

determining an identity of the object using one or more sensors associated with the electronic detection device, wherein the one or more sensors include a sensor configured to measure a distance between the electronic detection device and the object; and determining a quantity of the object to be restocked at the expected location based at least in part on the identity and distance.

10. The method of claim 9, further comprising:
suspending the electronic detection device from a shelving fixture,
disposing the electronic detection device alone a back wall of a shelving fixture, wherein the first movement is created by the first motor controlling a winding operation and unwinding operation of the first line and the second movement is created by the second motor controlling a winding operation and unwinding operation of the second line.

11. The method of claim 9, further comprising receiving the electronic detection device at a docking station and providing an electrical charge to the electronic detection device via the docking station.

12. The method of claim 9, further comprising receiving the electronic detection device at a docking station and providing an electrical connection via the docking station to transfer information between the electronic detection device and one or more remote servers.

13. The method of claim 9, further comprising controlling the first motor and the second motor to move the electronic detection device along a predetermined path.

14. The method of claim 9, wherein the controller is disposed within the electronic detection device.

15. The method of claim 9, wherein the sensor configured to measure a distance between the electronic detection device and the object comprises a laser range finder.

16. The method of claim 9, wherein the one or more sensors include a camera configured to capture images or video of the object, or a sensor configured to read a machine-readable code associated with the object.

17. A system for monitoring object locations on a shelving fixture, the system comprising:

an electronic device, wherein the electronic detection device is configured to traverse a back wall of a shelving fixture proximal to an expected location of an object disposed on the shelving fixture;

a controller communicatively coupled to the electronic device;

a first motor coupled to the electronic device and communicatively coupled to the controller;

a second motor coupled to the electronic device and communicatively coupled to the controller;

wherein the first motor is configured to operate in a first mode of operation, via the controller, to unwind a first line on a first spool coupled to the first motor to extend the first line further out of the electronic device and the second motor is configured to operate in a second mode of operation, via the controller to winding a second line on a second spool coupled to the second motor to retract the second line further into the electronic device, wherein the first motor operates in the first mode and the second motor operates in the second mode to move the electronic device along the back wall of the shelving fixture, the movement of the electronic detection device horizontally traversing the shelving fixture;

the first motor is configured to operate in a third mode of operation, via the controller, and the second motor is configured to operate in a third mode of operation, via the controller to move the electronic device along the back wall of the shelving fixture, the movement of the electronic detection device vertically traversing the shelving fixture.

18. The system of claim 17, wherein the third mode of operation comprises winding the first line on a first spool coupled to the first motor and winding the second line on a second spool coupled to the second motor.

19. The system of claim 17, wherein the electronic device comprises one or more sensors configured to determine an identity of the object and a quantity of the object at the expected location.

20. An object monitoring device comprising:
a housing having a first opening and a second opening;
a first spool disposed within the housing;
a second spool disposed within the housing;
a first line having a first terminal end operatively coupled to the first spool and a second terminal end extending through the first opening in the housing, the second terminal end of the first line being configured to be anchored to a shelving fixture;
a second line having a first terminal end operatively coupled to the second spool and a second terminal end extending through the second opening in the housing, the second terminal end of the second line being configured to be anchored to a shelving fixture;
a first motor disposed within a housing, the first motor being operatively coupled to the first spool and configured to rotate the first spool to wind the first line on the first spool or to unwind the first line from the first spool;
a second motor disposed within the housing, the second motor being operatively coupled to the second spool and configured to rotate the second spool to wind the second line on the second spool or to unwind the second line from the spool;
at least one controller in communication with the first and second motors disposed within the housing, the controller being configured to control the winding of the first and second lines with the first motor and the second motor to move and position the electronic detection device proximal to an expected location of an object on the shelving fixture, wherein the electronic detection device is configured to be suspended from the first line and the second line; and
one or more sensors associated with the electronic detection device and configured to determine an identity of the object and a quantity of the object at the expected location.

* * * * *